United States Patent
Roses et al.

(10) Patent No.: US 10,808,819 B2
(45) Date of Patent: Oct. 20, 2020

(54) TORQUE CONVERTER ASSEMBLY AND SINGLE FACE TORQUE CONVERTER CLUTCH

(71) Applicant: GM GLOBAL TECHNOLOGY OPERATIONS LLC, Detroit, MI (US)

(72) Inventors: Victor M. Roses, Ann Arbor, MI (US); Ted R. Skrzycke, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 16/135,668

(22) Filed: Sep. 19, 2018

(65) Prior Publication Data

US 2020/0088282 A1 Mar. 19, 2020

(51) Int. Cl.
*F16H 41/26* (2006.01)
*F16H 45/02* (2006.01)
*F16H 45/00* (2006.01)

(52) U.S. Cl.
CPC ............. *F16H 41/26* (2013.01); *F16H 45/02* (2013.01); *F16H 2045/007* (2013.01); *F16H 2045/0205* (2013.01); *F16H 2045/0226* (2013.01); *F16H 2045/0278* (2013.01)

(58) Field of Classification Search
None
See application file for complete search history.

(56) References Cited

U.S. PATENT DOCUMENTS

| | | | | |
|---|---|---|---|---|
| 4,143,561 A | * | 3/1979 | Melhorn | F16F 15/129 192/214.1 |
| 4,924,977 A | * | 5/1990 | Crawford | F16H 45/02 192/3.28 |
| 6,280,333 B1 | * | 8/2001 | Thevenon | F16H 45/02 192/212 |
| 6,938,744 B2 | * | 9/2005 | Tomiyama | F16H 45/02 192/212 |
| 7,887,240 B2 | * | 2/2011 | Marathe | F16C 17/04 384/303 |
| 7,938,243 B2 | * | 5/2011 | Avins | F16H 45/02 192/204 |
| 8,813,484 B2 | | 8/2014 | Roses et al. | |
| 9,127,759 B2 | * | 9/2015 | Fingerman | F16H 41/24 |
| 9,303,700 B2 | * | 4/2016 | Lindemann | F16H 41/24 |
| 9,309,956 B2 | * | 4/2016 | Lindemann | F16H 45/02 |
| 9,915,328 B2 | * | 3/2018 | Moore | F16H 41/24 |
| 10,352,423 B2 | * | 7/2019 | Cai | F16H 61/148 |
| 10,378,632 B2 | * | 8/2019 | Hess | F16D 25/0632 |
| 2004/0172936 A1 | * | 9/2004 | Mueller | F16H 45/02 60/330 |

(Continued)

*Primary Examiner* — Ernesto A Suarez
*Assistant Examiner* — James J Taylor, II

(57) ABSTRACT

A torque converter assembly configured to be connected between an engine and a transmission in a vehicle. The torque converter assembly comprises a cover plate having a cover plate pilot portion, a pump, a turbine, a stator, and a clutch assembly operably connected between the cover plate and the turbine. The clutch assembly comprises a piston plate having a single clutch face and a piston pilot portion. The cover plate pilot portion and the piston pilot portion are both configured to be piloted by the engine. A pilot plate located between the cover plate and clutch assembly can help control the amount and/or velocity of fluid that hydrodynamically connects various portions of the torque converter assembly.

13 Claims, 3 Drawing Sheets

(56) References Cited

U.S. PATENT DOCUMENTS

2009/0088261 A1    4/2009  Clark et al.
2009/0238505 A1*  9/2009  Jameson ................. F16C 17/04
                                                                             384/123

* cited by examiner

TORQUE CONVERTER ASSEMBLY AND SINGLE FACE TORQUE CONVERTER CLUTCH

INTRODUCTION

The field of technology generally relates to vehicle torque converter assemblies, more particularly, to single face torque converter clutches.

The torque converter is a hydrodynamic device positioned between the engine and transmission of a vehicle. The torque converter assembly provides a fluid coupling that can be used to manipulate and transmit power from the engine to the various components of the vehicle transmission such as the driveshaft, differential, and wheels. A torque converter clutch, also known as a lockup clutch, mechanically links the engine and transmission when actuated, bypassing various components of the torque converter to transmit power directly from the engine to the transmission. Single face torque converter clutches have a single clutch face, and are more compact than other implementations such as twin face torque converter clutches. The single face torque converter clutch can be advantageous in smaller vehicles, for example, where component space is at more of a premium. With typical single face torque converter clutches, however, the piston plate is typically piloted off the transmission, which can result in misalignment between the engine shaft or crankshaft and the transmission shaft. Providing a single face torque converter clutch with the potential to improve alignment between the engine shaft or crankshaft and the transmission shaft is desirable.

SUMMARY

According to one embodiment, there is provided a torque converter assembly configured to be connected between an engine and a transmission in a vehicle. The torque converter assembly comprises a cover plate having a cover plate pilot portion; a pump having a plurality of impeller blades; a turbine having a plurality of turbine blades; a stator having a plurality of stator vanes disposed between the pump and the turbine; and a clutch assembly operably connected between the cover plate and the turbine. The clutch assembly comprises a piston plate having a single clutch face and a piston pilot portion. The cover plate pilot portion and the piston pilot portion are both configured to be piloted by the engine.

According to various embodiments, this assembly may further include any one of the following steps or features or any technically-feasible combination of these steps or features:
 a pilot plate between the cover plate and the clutch assembly;
 the pilot plate includes a plurality of fluid channels configured to limit fluid flow between the cover plate and the clutch assembly;
 the pilot plate includes a flanged central hub;
 the flanged central hub surrounds the piston pilot portion;
 a polymer bushing is located between the flanged central hub and the piston pilot portion;
 the pilot plate includes a plurality of fluid channels extending radially from the flanged central hub to an outer perimeter of the pilot plate;
 the pilot plate is attached to the cover plate such that the pilot plate rotates with the cover plate; and/or
 the attachment of the pilot plate to the cover plate permits relative movement between the piston pilot portion and the pilot plate.

According to another embodiment, there is provided a torque converter assembly configured to be connected between an engine and a transmission in a vehicle. The torque converter assembly comprises a cover plate having a cover plate pilot portion; a pump having a plurality of impeller blades; a turbine having a plurality of turbine blades; a stator having a plurality of stator vanes disposed between the pump and the turbine; a clutch assembly operably connected between the cover plate and the turbine, the clutch assembly comprising a piston plate having a piston pilot portion, wherein the cover plate pilot portion and the piston pilot portion are both configured to be piloted by the engine; and a pilot plate operably connected between the cover plate and the clutch assembly.

According to various embodiments, this assembly may further include any one of the following steps or features or any technically-feasible combination of these steps or features:
 the pilot plate includes a flanged central hub that surrounds the piston pilot portion;
 a polymer bushing is located between the flanged central hub and the piston pilot portion;
 the pilot plate includes a plurality of fluid channels extending radially from the flanged central hub to an outer perimeter of the pilot plate; and/or
 the piston plate has a single clutch face.

According to yet another embodiment, there is provided a torque converter clutch assembly for a vehicle comprising a piston plate having a single clutch face and a piston pilot portion; and a pilot plate having a flanged central hub that surrounds the piston pilot portion and a bushing located between the flanged central hub and the piston pilot portion. The pilot plate includes a plurality of fluid channels configured to reduce a fluid velocity of fluid traveling toward the single clutch face during use of the torque converter clutch assembly.

According to various embodiments, this assembly may further include any one of the following steps or features or any technically-feasible combination of these steps or features:
 the plurality of fluid channels radially extend from the flanged central hub to an outer perimeter of the pilot plate;
 the piston pilot portion is configured to be piloted off an engine of the vehicle; and/or
 a reduction of the fluid velocity compensates for an increase in an average fluid velocity from piloting the piston pilot portion off the engine of the vehicle.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The torque converter assembly described herein can advantageously allow for common, self-contained piloting of a piston plate and a cover plate for a single face clutch assembly. Instead of piloting the piston plate off the transmission shaft, the piston plate is piloted off the engine along with the cover plate, which can improve alignment between the transmission shaft and the crankshaft. Further, a pilot plate can be used between the cover plate and the piston plate to reduce the amount of fluid and/or the fluid velocity of fluid traveling toward the single clutch face during use of the torque converter assembly. This can advantageously reduce the centrifugal imbalance load and improve the clutch response. Additionally, the common pilot of the piston plate and cover plate off the engine can reduce clutch runout, thereby reducing any associated clutch performance and wear issues resulting therefrom.

Figure 1:
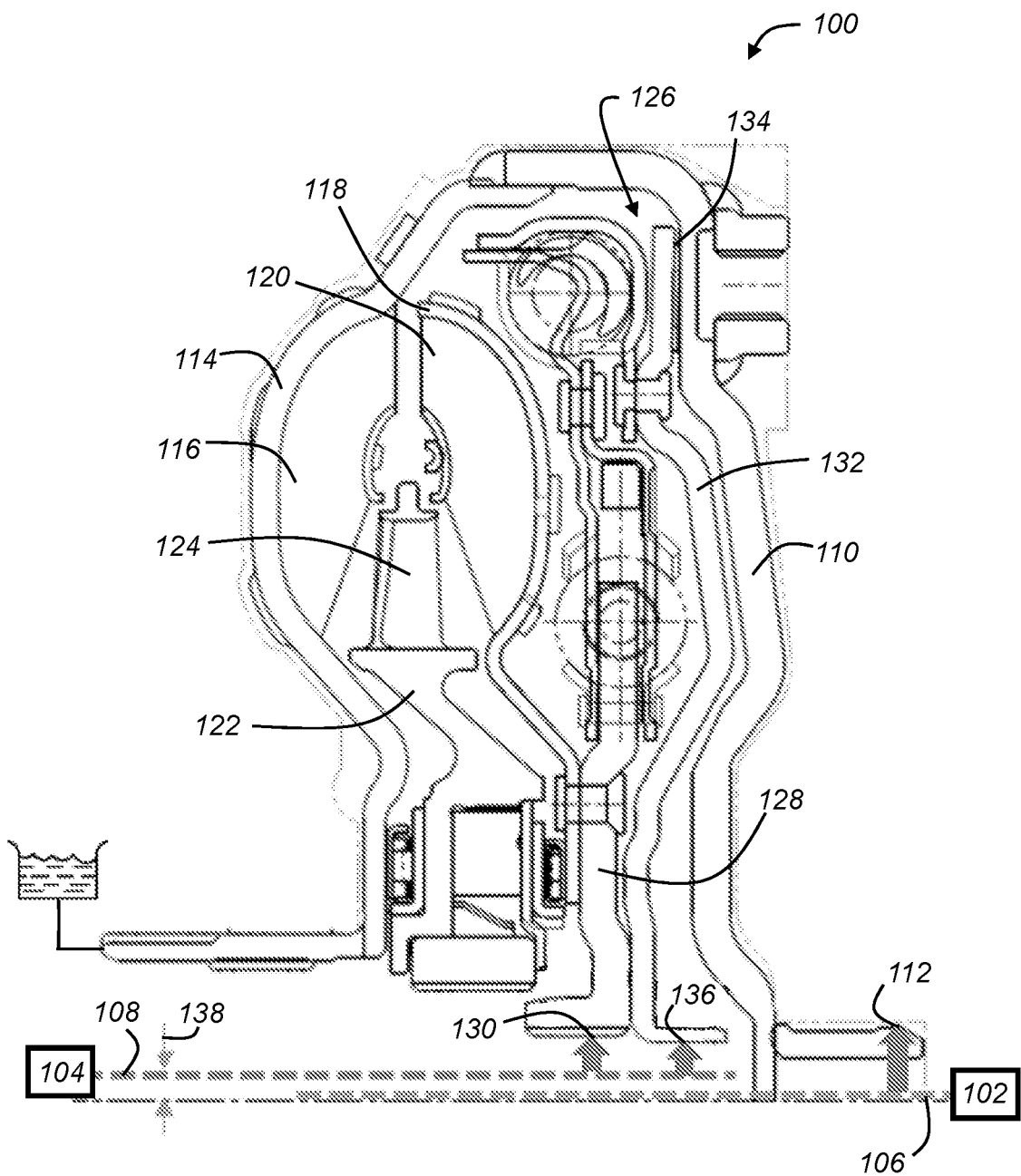
FIG. 1 is a partial, schematic, cross-section view of a prior art torque converter assembly.

FIG. 1 illustrates a torque converter assembly 100 in accordance with the prior art. The torque converter assembly 100 is connected between an engine 102 and a transmission 104 of a vehicle, with various components of the torque converter assembly 100 being piloted by the crankshaft 106 and transmission shaft 108 of the engine (input) and transmission (output), respectively. The torque converter assembly 100 includes a cover plate 110 having a cover plate pilot portion 112, a pump 114 having a plurality of impeller blades 116, a turbine 118 having a plurality of turbine blades 120, and a stator 122 having a plurality of stator vanes 124 disposed between the pump and the turbine. A clutch assembly 126 is operably connected between the cover plate 110 and the turbine 118. The clutch assembly 126 includes a damper plate 128 having a damper pilot portion 130, as well as a piston plate 132 having a single clutch face 134 and a piston pilot portion 136. As schematically illustrated, the damper plate 128 and the piston plate 132 are piloted off the transmission shaft 108 at the damper pilot portion 130 and the piston pilot portion 136, respectively, whereas the cover plate 110 is piloted off the crankshaft 106 at the cover plate pilot portion 112. This piloting arrangement can cause a misalignment 138 between the respective centerlines of the crankshaft 106 and the transmission shaft 108. Other piloting configurations, beyond that specifically illustrated, where the damper pilot portion 130 and the piston pilot portion 136 are commonly piloted, may also cause misalignment. In some implementations, this misalignment 138 can be up to 0.7 mm or more.

Figure 2:
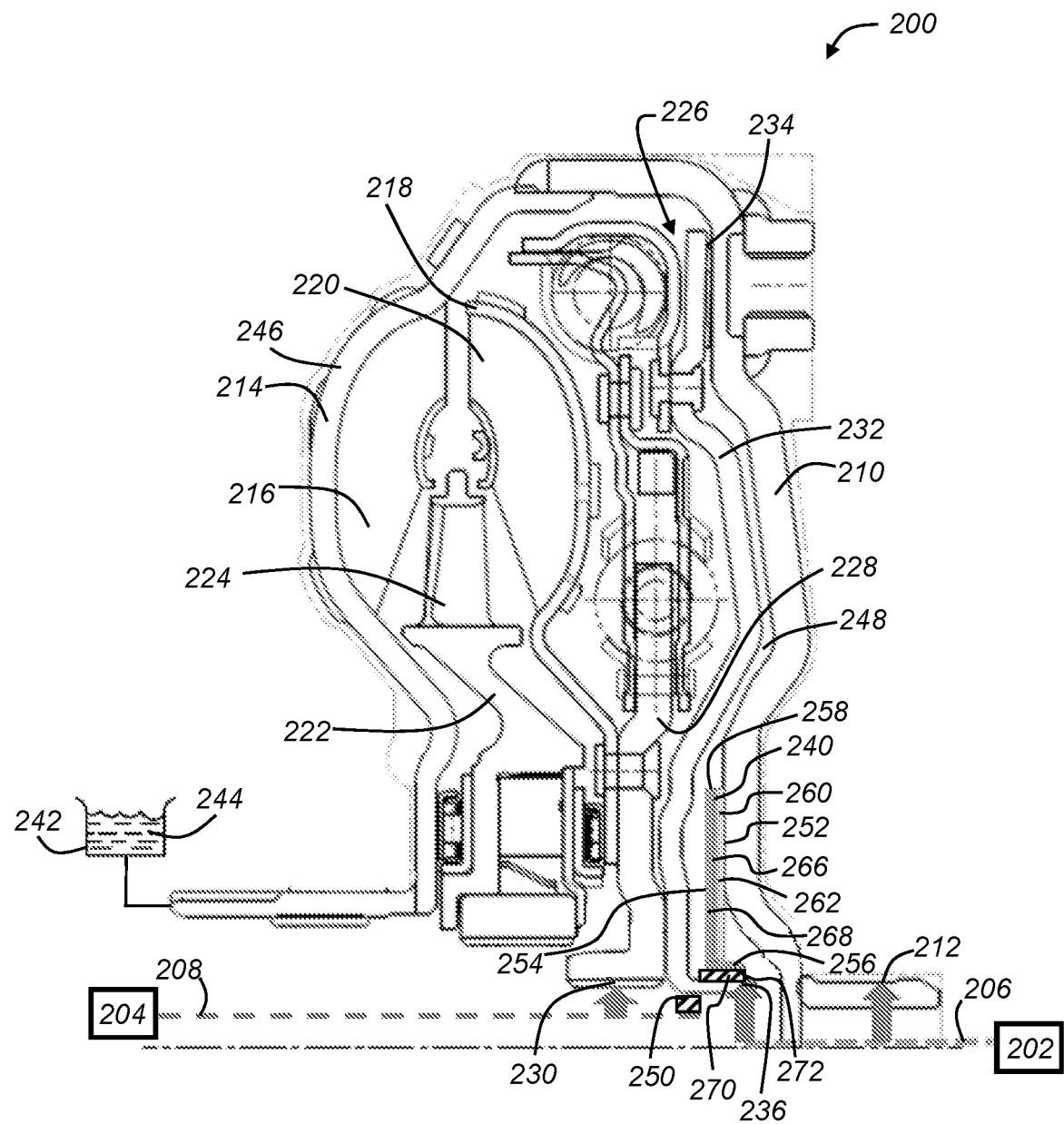
FIG. 2 is a partial, schematic, cross-section view of a torque converter assembly having a pilot plate in accordance with one embodiment.

The torque converter assembly 200 depicted in FIG. 2 can help minimize this misalignment. The torque converter assembly 200 is connected between an engine 202 and a transmission 204 of a vehicle, with various components of the torque converter assembly 200 being piloted by the crankshaft 206 and transmission shaft 208 of the engine (input) and transmission (output), respectively. The torque converter assembly 200 includes a cover plate 210 having a cover plate pilot portion 212, a pump 214 having a plurality of impeller blades 216, a turbine 218 having a plurality of turbine blades 220, and a stator 222 having a plurality of stator vanes 224 disposed between the pump and the turbine. A clutch assembly 226 is operably connected between the cover plate 210 and the turbine 218. The clutch assembly 226 includes a damper plate 228 having a damper pilot portion 230, as well as a piston plate 232 having a single clutch face 234 and a piston pilot portion 236. Instead of having the cover plate 210 and the piston plate 232 piloted separately (e.g., as in the split pilot system illustrated in FIG. 1), the cover plate 210 and the piston plate 232 are piloted together by the crankshaft 206 of the engine 202. A pilot plate 240 can be provided between the cover plate 210 and the clutch assembly 226 to help compensate for an increase in the average fluid velocity toward the single clutch face 234 given the absence of the pilot from the piston plate 232 to the transmission shaft 208.

The engine 202 is an internal combustion engine, and can be a diesel or gasoline powered engine to cite two examples, although an alternate fuel source may be used. The engine 202 has one or more cylinders with a piston. The piston rotates the crankshaft 206 via volumetric changes in the combustion chamber due to ignition and combustion of an air fuel mixture. The representation of engine 202, transmission 204, and torque assembly 200 is schematic, and accordingly, other features not illustrated may be provided, such as a flywheel, various gears, valves, seals, or shafts, etc. Additionally, in some embodiments, the vehicle employing the torque converter assembly 200 may be a hybrid vehicle such that the internal combustion engine 202 is not the only source of motive power, and one or more motor/generators are used to supplement the engine 202. In yet another embodiment, the engine 202 may be an electric engine or any other type of prime mover that generally supplies driving torque to the transmission 204 via the crankshaft 206.

The transmission 204 outputs driving torque from the engine 202 via the torque converter assembly 200 and the transmission shaft 208. The transmission 204 may be a front-wheel drive transmission, a rear-wheel drive transmission, an all-wheel drive transmission, etc., that controllably distributes torque to the various components of the vehicle. In some embodiments, the transmission 204 includes a gearbox including various gear sets, shafts, and clutches and/or brakes to selectively transmit power to other various components such as a driveshaft and wheels of the vehicle.

The torque converter assembly 200 provides a fluid coupling that can be used to manipulate and transmit power from the engine 202 to the transmission 204 and its various components. An oil pan or sump volume 242 is configured to provide fluid 244, such as transmission oil or automatic transmission fluid (ATF), to the torque converter assembly 200. The fluid is generally contained within a pump housing 246 of the pump 214 and the cover plate 210, which are attached to each other so that the pump 214 is driven when the engine 202 drives the cover plate 210. A plurality of impeller blades 216 connected to and circumferentially spaced around the inside of the pump 214 direct the transmission oil 244 toroidally outward toward the turbine 218. With sufficient force, the turbine blades 220 rotate with the impeller blades 216. Fluid exiting the turbine 218 via the turbine blades 220 impacts stator vanes 224 of the stator 222. The stator 222 redirects fluid flow from the turbine 218 to the pump 214 in the same direction as the rotation of the impeller blades 216, thereby reducing pump torque and causing torque multiplication.

Hydrodynamic coupling between the pump 214 and the turbine 218 can be bypassed by engaging or actuating the clutch assembly 226. When the clutch assembly 226 is engaged, the piston plate 232 presses against the cover plate 210 at the single clutch face 234 which is generally lined with a friction material. This embodiment is known as a single face torque converter clutch or a single face lock up clutch. As described above, current single face clutch assemblies use the transmission to pilot the piston plate. However, in this embodiment, the piston plate 232 is piloted at the piston pilot portion 236 by the engine 202 via crankshaft 206, not the transmission 204 as is typical. Accordingly, the FIG. 2 embodiment includes a self-contained, single face clutch assembly 226 that uses one, engine-side pilot. This is different than other implementations such as a twin face or dual face clutch assembly. Twin or dual face clutch assemblies are typically larger than single face clutch assemblies, and more space is needed to pilot the various portions of the clutch. For example, twin or dual face clutch assemblies often use straps and/or leaf springs to pilot the piston plate, which can take up more space. Such connections typically are not as feasible with a single face clutch assembly, as the cover plate 210 and the piston plate 232 are oftentimes traveling at different speeds. Further, these types of connections may be undesirable in smaller vehicle applications where component space is limited. Accordingly, the single face clutch assembly 226 of FIG. 2 advantageously uses a common pilot at the cover plate pilot portion 212 and the piston pilot portion 236, while maintaining its space saving and reduced complexity qualities. The piloting may be accomplished using a splined connection, a journal to pick up the pilot of the crankshaft 206, or some other operable arrangement. Additionally, a seal 250 may be used between the piston pilot portion 236 and the transmission shaft 208. A compliant, non-rotating seal 250 can help improve transmission shaft 208 to crankshaft 206 centerline misalignment. The seal 250 can provide better compliance with the transmission shaft 208 (e.g., about 0.5 mm in one embodiment), and may be a radially-compliant or relaxed O-ring.

Removing the pilot between the piston plate 232 and the transmission shaft 208 has the potential to increase the amount of oil 244 and/or the speed of the oil that flows in the space 248 between the piston plate 232 and the cover plate 210. The pilot plate 240 can help reduce some of this centrifugal oil balance by slowing and/or limiting the amount of oil that travels toward the single clutch face 234. The pilot plate 240 is located in the space 248 between the piston plate 232 and the cover plate 210. The pilot plate 240 helps to redistribute the centrifugal bias pressure differential, thereby improving clutch balance.

Figure 3:
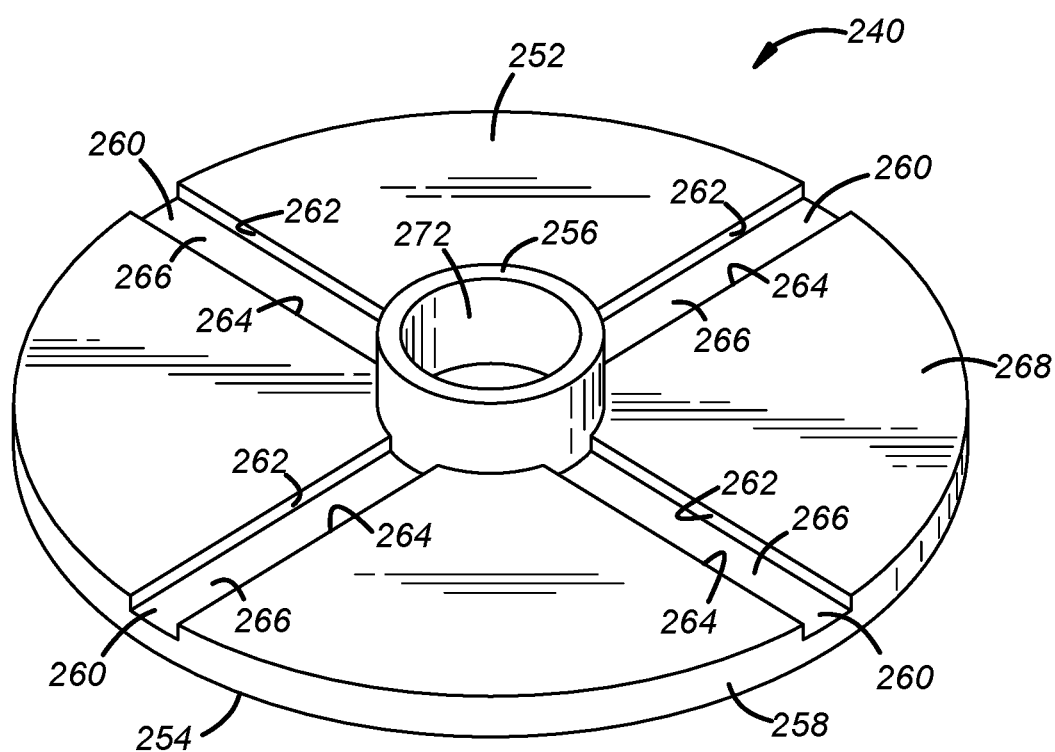
FIG. 3 shows the pilot plate of the torque converter assembly of FIG. 2.

FIG. 3 illustrates one embodiment of the pilot plate 240. The pilot plate 240 includes an engine-facing side 252, a transmission-facing side 254, a flanged central hub 256, and an outer perimeter 258. A plurality of fluid channels 260 extend radially from the flanged central hub 256 to the outer perimeter 258. The engine-facing side 252 is attached to the cover plate 210, preferably by welding or riveting, such that the fluid channels 260 define the path for fluid 244 in the space 248 between the cover plate 210 and the piston plate 232. Attachment of the pilot plate 240 to the cover plate 210 can help provide additional structural reinforcement to the front cover, thereby potentially improving the response of the clutch assembly 226. With the engine-facing side 252 attached to the cover plate 210, fluid flow is generally limited through the plurality of fluid channels 260. There may be more or less fluid channels 260 than what is illustrated in FIG. 3. Further, the shape and dimension of each fluid channel 260 may be altered to impart various performance characteristics, such as directional flow control and centrifugal balance. In the illustrated embodiment, each fluid channel 260 has a pair of sidewalls 262, 264 which extend between a base 266 of each fluid channel and the engine-facing side 252. The depth of each channel 260 may be generally uniform as illustrated, or it may vary. For example, the depth may be greater toward the flanged central hub 256 and shallower toward the outer perimeter 258 to change the velocity of the fluid 244. Also, in another embodiment, the depth of each channel may extend further towards the transmission-facing side 254 such that the thickness of the body 268 of the pilot plate 240 is generally uniform. The shape of each channel 260 may be more rounded than what is shown, and may have variations along its axial or radial extent. For example, the channels 260 may include a network of interconnected channels that generally extend along the engine-facing side 252 from the flanged central hub 256 to the outer perimeter 258. In one embodiment, the pilot plate 240 is a single piece of stamped or drawn metal, such as aluminum, with the flanged central hub 256 and the channels 260 being formed during the stamping or drawing process. Other manufacturing methods are certainly possible, such as separately attaching the flanged central hub 256 or machining the channels 260.

Returning to FIG. 2, the flanged central hub 256 of the pilot plate 240 is situated along the piston pilot portion 236. In an advantageous embodiment, the length of the flanged central hub 256 coincides with the dimensions of the piston pilot portion 236 so as to leave the size of the space 248 between the piston plate 232 and the cover plate 210 at the piston pilot portion 236 generally consistent. Accordingly, the shape and configuration of the flanged central hub 256 can vary depending on the configuration of the piston pilot portion 236. In the illustrated embodiment, a polymer bushing 270 is used between the flanged central hub 256 and the piston pilot portion 236. The bushing 270 may be a polytetrafluoroethylene (PTFE) based coating on the internal bore 272 of the flanged central hub 256. A polymer bushing 270 that is PTFE-based may be advantageous, as it may allow easier relative movement between the pilot plate 240 and the piston plate 232.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A torque converter assembly configured to be connected between an engine and a transmission in a vehicle, the torque converter assembly comprising:
   a cover plate having a cover plate pilot portion;
   a pump having a plurality of impeller blades;
   a turbine having a plurality of turbine blades;
   a stator having a plurality of stator vanes disposed between the pump and the turbine;
   a clutch assembly operably connected between the cover plate and the turbine, the clutch assembly comprising a piston plate having a single clutch face and a piston pilot portion, wherein the cover plate pilot portion and the piston pilot portion are both configured to be piloted by the engine; and
a pilot plate between the cover plate and the clutch assembly, wherein the pilot plate includes a flanged central hub wherein the pilot plate includes a plurality of fluid channels extending radially from the flanged central hub to an outer perimeter of the pilot plate.

2. The torque converter assembly of claim 1, wherein the pilot plate includes the plurality of fluid channels configured to limit fluid flow between the cover plate and the clutch assembly.

3. The torque converter assembly of claim 1, wherein the flanged central hub surrounds the piston pilot portion.

4. The torque converter assembly of claim 3, wherein a polymer bushing is located between the flanged central hub and the piston pilot portion.

5. The torque converter assembly of claim 1, wherein the pilot plate is attached to the cover plate such that the pilot plate rotates with the cover plate.

6. The torque converter assembly of claim 5, wherein the attachment of the pilot plate to the cover plate permits relative movement between the piston pilot portion and the pilot plate.

7. A torque converter assembly configured to be connected between an engine and a transmission in a vehicle, the torque converter assembly comprising:
a cover plate having a cover plate pilot portion;
a pump having a plurality of impeller blades;
a turbine having a plurality of turbine blades;
a stator having a plurality of stator vanes disposed between the pump and the turbine;
a clutch assembly operably connected between the cover plate and the turbine, the clutch assembly comprising a piston plate having a piston pilot portion, wherein the cover plate pilot portion and the piston pilot portion are both configured to be piloted by the engine; and
a pilot plate operably connected between the cover plate and the clutch assembly wherein the pilot plate includes a plurality of fluid channels extending radially from a flanged central hub to an outer perimeter of the pilot plate.

8. The torque converter assembly of claim 7, wherein the pilot plate includes the flanged central hub that surrounds the piston pilot portion.

9. The torque converter assembly of claim 8, wherein a polymer bushing is located between the flanged central hub and the piston pilot portion.

10. The torque converter assembly of claim 7, wherein the piston plate has a single clutch face.

11. A torque converter clutch assembly for a vehicle, comprising:
a piston plate having a single clutch face and a piston pilot portion; and
a pilot plate having a flanged central hub that surrounds the piston pilot portion and a bushing located between the flanged central hub and the piston pilot portion, wherein the pilot plate includes a plurality of fluid channels configured to reduce a fluid velocity of fluid traveling toward the single clutch face during use of the torque converter clutch assembly, and wherein the plurality of fluid channels radially extend from the flanged central hub to an outer perimeter of the pilot plate.

12. The torque converter clutch assembly of claim 11, wherein the piston pilot portion is configured to be piloted off an engine of the vehicle.

13. The torque converter clutch assembly of claim 12, wherein a reduction of the fluid velocity compensates for an increase in an average fluid velocity from piloting the piston pilot portion off the engine of the vehicle.

* * * * *